Patented Apr. 26, 1927.

1,625,925

UNITED STATES PATENT OFFICE.

JOHN C. WOODRUFF AND GROVER BLOOMFIELD, OF TERRE HAUTE, INDIANA, ASSIGNORS TO COMMERCIAL SOLVENTS CORPORATION, OF TERRE HAUTE, INDIANA, A CORPORATION OF MARYLAND.

CATALYST FOR SYNTHETIC-METHANOL PRODUCTION.

No Drawing.   Application filed June 21, 1926. Serial No. 117,612.

Our invention relates to the production of methanol by the high pressure catalytic combination of oxides of carbon with hydrogen, and pertains more directly to the preparation and employment of improved catalysts in the process.

Methanol may be produced by combining oxides of carbon with hydrogen in the presence of a suitable catalyst at elevated temperature and pressure. Carbon monoxide, carbon dioxide, and mixture of the two oxides may be employed, these substances reacting with hydrogen according to the following reactions:—

Carbon monoxide—$CO + 2H_2 \rightleftarrows CH_3OH$
Carbon dioxide—$CO_2 + 3H_2 \rightleftarrows CH_3OH + H_2O$ It is observed that when carbon dioxide is the oxide employed, one molecule of water is formed for every molecule of methanol produced. On the other hand when pure carbon monoxide is used, theoretically there is nothing produced by the reaction but methanol. Actually in practice pure carbon monoxide and pure carbon dioxide are both difficult to obtain economically, so that the methanol synthesis is carried out by reacting a mixture of carbon monoxide and carbon dioxide with hydrogen.

In addition to the reactions producing methanol there are, in the methanol synthesis, undesirable side-reactions which cut down the yield of the desired product. The principal side reaction which may occur is the formation of methane, which is illustrated below:

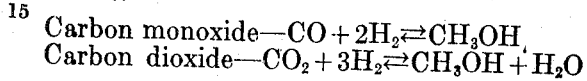

In addition to the methane side-reaction there are other side-reactions which sometimes occur in which there are produced esters, aldehydes, organic acids, ketones, and hydrocarbons other than methane; these reactions occurring as the result of the polymerization or condensation of methanol or its decomposition products.

When a gas mixture comprising carbon oxides mixed with an excess of hydrogen over the amount theoretically required to produce methanol is passed over a catalytic substance comprising metals or their oxides at a pressure above 50 atmospheres and at a temperature above 250° C. there is nearly always produced some reaction between the gaseous components. The extent of this reaction depends to some degree on space velocity, temperature, and pressure, but the fact remains that under the conditions outlined, carbon oxides and hydrogen react to some extent in all cases.

The substances formed by such a process depend, both as to identity and as to amount, almost entirely on the nature and activity of the catalytic substance present. In general, finely divided metals or mixtures of metallic oxides non-reducible to free metal under the conditions of the methanol synthesis are catalytic substances which cause the production of more or less methanol. Iron and nickel and their oxides, while useful hydrogenating and dehydrogenating catalysts in many other instances, have in the past been deemed unsuitable for employment as methanol catalysts on account of their strong methanating action which largely prevents methanol formation, the carbon oxides being reduced to methane.

We have discovered a new type of methanol catalyst which produces a higher yield of methanol than those formerly employed in the art, and at the same time produces a very pure methanol, uncontaminated by by-products. An additional advantage accruing from the use of our catalysts is that the formation of methane in the process—with the consequent destruction of valuable hydrogen—is practically eliminated.

It is known that metal oxides, non-reducible or difficultly reducible to metals under the conditions of the methanol reaction serve as satisfactory base or principal materials in the formulation of methanol catalysts (U. S. Patent 1,558,559). For example the oxides of metals of the second group in the Periodic Table of Elements—such as zinc and magnesium—may be alternatively employed as principal catalysts, but since by themselves the oxides are not true catalysts they are combined with smaller quantities of catalyst "promoters"—which in turn may consist of other metallic oxides of the Third to Seventh Periodic Table groups.

For example, zinc oxide—per se—is not a suitable catalyst, but in admixture with a less basic metal oxide, such as the oxides of chromium, manganese, molybdenum, titanium, cerium, vanadium, tungsten, etc., the said additive oxides apparently acting as "promoters," the mixture becomes a good catalyst for methanol production.

Similarly magnesium may be used to replace zinc in the production of such catalysts. In the prior art the catalyst mixtures of this type uniformly contained a greater proportion of the more basic (zinc or magnesium) oxides, and a lesser proportion of the additive oxide.

We have now discovered that methanol catalysts comprising mixtures of non-reducible or difficultly reducible metallic oxides may be greatly improved by the addition of a metallic halide. The precise metal employed in the halide may be either identical with or different from the metal of the oxides.

The method by which the metallic halides produce the improvement is not known to us. At least three theories may be used to account for the phenomenon—namely:—

(1) The metallic halide acts as an ordinary "promoter" in increasing catalyst activity;

(2) The metallic halide interacts with other metallic oxides present in the catalyst to produce oxychloride compounds which, in turn, either serve as catalyst promoters, or may so modify the purely physical state of the mass as to produce a more active catalyst;

(3) The metallic halide may be reduced by the high pressure contact with hydrogen and carbon oxides during the commencement of its use as a catalyst and the resultant finely divided metal may increase the catalyst activity, or alternatively, the metallic halide may first react with some other metal producing the halide thereof, which may be reduced in the same manner.

However, the precise explanation for the improved result attained by the addition of metallic halides to methanol catalyst is not known and forms no part of our invention.

To produce our improved catalyst it is not necessary that the amount of metallic halide added bear any exact weight relation to the remaining constituents of the catalyst, though the amount of halide added should preferably be less than one chemical equivalent of the amount of principal metallic oxide present in the catalyst.

Our invention is of widespread usefulness in the methanol art and to further disclose it but in no manner to limit it beyond the limitations derived from the whole specification we append the following examples:

Our improved catalyst consist of the following elements.

I. An oxide of a second group (Mendeleeff's Periodic Table) metal;

II. An oxide of a metal of the third to seventh group to serve as a promoter;

III. A metallic halide.

Below are appended illustrative examples of such catalyst mixtures:—

Zinc oxide—chromium oxide—zi chloride.

Zinc oxide—chromium oxide—vanadium chloride.

Zinc oxide—manganese oxide—magnesium chloride.

Magnesium oxide—vanadium oxide—magnesium fluoride.

Magnesium oxide—chromium oxide—chromium chloride.

Strontium oxide—chromium oxide—zinc chloride.

Zinc oxide—vanadium oxide—magnesium chloride.

In general, catalysts of this type are most effective if the oxide of the second group metal is present in predominating quantity over the other, promoting, oxide. However catalysts containing oxides in the reverse ratio produce methanol and are included in our invention.

The addition of a solution of zinc chloride to a mixture of zinc oxide and chromium oxide, followed by a drying and recovery of the mass, produces a catalyst giving results superior to those known in the art. Similar improved catalysts are obtained when other combinations of second group metal oxides and metallic halides are combined—for example magnesium compounds.

As illustrative of our improved catalysts the following results are appended.

*Example I.*

A catalyst base material is prepared by dissolving 8 kilograms of chromic nitrate $(Cr(NO_3)_3 \cdot 9H_2O)$ in 5 liters of water; adding with stirring 5 kilograms of zinc oxide, evaporating the mass to dryness, and heating until the chromic nitrate is converted to chromic oxide. The mixture is then broken up and sieved through a 65 mesh screen.

If a quantity of this material is mixed with 10% of dextrin or a similar agglutenating agent dissolved in 10 parts of water and the resultant mixture dried and broken up into granules, a catalyst is obtained such as is described in the prior art.

When a mixture of carbon oxides and hydrogen comprising, say 10% of carbon dioxide and 90% of hydrogen at a pressure of 2200 pounds is passed through 1000 cubic centimeters of such a catalyst at a space velocity of 75,000 and at a temperature of about 350–400° C. there will be produced about 900–1000 cubic centimeters of condensate per hour. On analysis this condensate will show 40–46% methanol, the remainder being largely water. An analysis of the residual gas will show a considerable methane formation, If to the dextrin solution used to granulate the sieved material there is added a zinc halide, preferably zinc chloride in such amount that it represents from 6-10% of the weight of zinc oxide and chromic oxide, the mass being dried and broken up in the same manner, an improved catalyst will result. Under the same reaction conditions this catalyst will produce from 1.7-2.0 liters of condensate per hour and this condensate will show about 55% of methanol, the remainder being substantially pure water. Furthermore an analysis of the residual gases will show a diminution in methane formation.

*Example II.*

If the zinc halide mentioned in Example I is replaced by an equivalent quantity of magnesium chloride similar improved results will be obtained. The yield of condensate may fall to about 1.6 liters per hour, the methanol content being unchanged.

*Example III.*

2200 grams of zinc oxide and 300 grams of chromic oxide are mixed in a solution of about 200 grams of zinc chloride and 250 grams of dextrin in 3 liters of water. The mass is dried and broken up into granules. When a gas mixture comprising 10% carbon dioxide, 2% carbon monoxide, and 88% hydrogen is passed through 1000 cubic centimeters of the catalyst, at a temperature of about 380-420° C., at a space velocity of 75,000-100,000 and at a pressure of 3000 pounds there will be produced, hourly, about 2 liters of condensate analyzing about 57% methanol.

In the absence of the zinc chloride the total volume of condensate will be reduced and the percentage yield of methonal will be greatly reduced.

*Example IV.*

If in Example III, the zinc oxide is replaced by magnesium oxide, the resultant catalyst under similar operating conditions will produce about 1.5 liters of condensate per hour, the methanol content remaining about the same.

*Example V.*

2600 grams of zinc nitrate $(Zn(NO_3)_2 \cdot 6H_2O)$ and 160 grams of tungstic oxide ($WoO_3$) are mixed and heated until the zinc nitrate is converted to zinc oxide. The resultant yellow mass is powdered and mixed with 400 grams of 50% zinc bromide solution. The resultant mass is dried and broken up into granules. When a gas mixture comprising 5% carbon dioxide, 5% carbon monoxide, and 90% hydrogen is passed through 1000 cubic centimeters of this catalyst at a space velocity of about 100,000, a temperature of about 400°, and at a pressure of 2500-3000 pounds, there will be produced, hourly, about 1.5 liters of condensate analyzing about 50% methanol.

*Example VI.*

3900 grams zinc nitrate $(Zn(NO_3)_2 \cdot 6H_2O)$ and 500 grams uranium nitrate $(UO_2(NO_3)_2 \cdot 6H_2O)$ is dissolved in 5 liters of warm water. To this mixture is added sufficient postassium carbonate to precipitate all of the zinc and uranium as carbonate and basic carbonate. The resultant precipitate is recovered, washed, dried, and moistened with a solution containing 200 grams zinc chloride. The mass is again dried, and is broken up into granules, whereupon it is ready for use.

When a gas mixture comprising 10% carbon dioxide and 90% hydrogen is passed at a space velocity of 75,000 over 1 liter of catalyst granules at a pressure of 2500 pounds and a temperature of 380-440° C. there is obtained hourly about 3 liters of condensate analyzing about 48% methanol. A similar catalyst to which a metallic halide is not added gives a far smaller yield and conversion to methanol.

The specific examples we have related are intended to display various phases of our invention and not to limit it. While in the above specific examples we have shown the use of metallic chlorides and metallic bromides, it should be understood that similar results are attained with other halides, though in general we prefer to employ chlorides on account of their relative non-volatility and ready accessibility. There exists, of course, a possibility of almost infinite variety in changes of percentage composition of our improved catalysts. We have observed however, that while changes in the proportionate amount of second group metal to promoter produce changes in catalyst effectiveness, at the same time the presence of a metal halide in the catalyst invariably produces greatly improved results.

It is, of course, obvious that one may replace a single second group oxide by a mixture of two such oxides. For example zinc oxide may be replaced by a mixture of zinc oxide and magnesium oxide. Likewise instead of one promoter oxide such as chromium oxide, one may employ a mixture. Such changes are within the spirit of our invention and the appended claims.

An increased space velocity produces an increased hourly yield and an increase in operating pressure has the same effect. Likewise the use of pure carbon monoxide as distinguished from carbon dioxide or a mixture of the two results in an increased methanol percentage in the condensate, and, since carbon monoxide seems to react more readily, an increased condensate volume.

Now having described our invention, we claim the following as new and novel:—

1. A methanol catalyst comprising a plurality of difficultly reducible second group metal oxides, a plurality of difficultly reducible metal oxides from the third to seventh groups, and a metallic halide.

2. A methanol catalyst comprising a difficultly reducible second group metal oxide, a difficultly reducible oxide of the third to seventh groups, and a metallic halide.

3. A methanol catalyst initially comprising a difficultly reducible second group metal oxide, a difficultly reducible oxide of the third to seventh groups, and a metallic halide.

4. A methanol catalyst initially comprising a difficultly reducible second group metal oxide, a lesser quantity of a difficultly reducible oxide of the third to seventh groups, and a metallic halide.

5. A methanol catalyst initially comprising a difficultly reducible second group metal oxide, a lesser quantity of a difficultly reducible oxide of the third to seventh groups, and a metallic chloride.

6. A methanol catalyst initially comprising a difficultly reducible second group metal oxide, a lesser quantity of a difficultly reducible metal oxide of the third to seventh groups, and a metallic halide in amount not exceeding one chemical equivalent of the second group oxide.

7. A methanol catalyst initially comprising a difficultly reducible second group metal oxide, a lesser quantity of a difficultly reducible metal oxide of the third to seventh groups, and a metallic chloride in amount not exceeding one chemical equivalent of the second group oxide.

8. A methanol catalyst comprising zinc oxide, chromium oxide, and a metallic halide.

9. A methanol catalyst comprising zinc oxide, chromium oxide and a metallic chloride.

10. A process for the production of synthetic methanol which comprises passing a mixture of hydrogen and carbon oxides at a pressure in excess of 50 atmospheres and at an elevated temperature, over a catalyst initially comprising a mixture of difficultly reducible oxides and a metallic halide.

11. A process for the production of synthetic methanol which comprises passing a mixture of hydrogen and carbon oxides at a pressure in excess of 50 atmospheres and at an elevated temperature, over a catalyst initially comprising a mixture of difficultly reducible oxides and a metallic chloride.

12. A process for the production of synthetic methanol which comprises passing a mixture of hydrogen and carbon oxides, at a pressure in excess of 50 atmospheres and at an elevated pressure, over a catalyst initially comprising a mixture of zinc oxide, chromium oxide, and zinc chloride.

In testimony whereof we affix our signatures.

JOHN C. WOODRUFF.
GROVER BLOOMFIELD.